(12) United States Patent
Muhr et al.

(10) Patent No.: US 11,096,520 B2
(45) Date of Patent: Aug. 24, 2021

(54) AIR FLOW COOKING APPLIANCE

(71) Applicant: SEB S.A., Ecully (FR)

(72) Inventors: Nicolas Muhr, Dijon (FR); Jérémy Quinard, Dijon (FR)

(73) Assignee: SEB S.A.

( * ) Notice: Subject to any disclaimer, the term of this patent is extended or adjusted under 35 U.S.C. 154(b) by 741 days.

(21) Appl. No.: 15/619,801

(22) Filed: Jun. 12, 2017

(65) Prior Publication Data

US 2017/0360254 A1 Dec. 21, 2017

(30) Foreign Application Priority Data

Jun. 15, 2016 (FR) ...................... 1655557

(51) Int. Cl.
*A47J 37/06* (2006.01)
*F24C 15/32* (2006.01)

(52) U.S. Cl.
CPC ......... *A47J 37/0641* (2013.01); *F24C 15/322* (2013.01); *A47J 37/06* (2013.01); *F24C 15/325* (2013.01)

(58) Field of Classification Search
CPC .... A47J 37/0641; A47J 37/06; A47J 37/0635; A47J 37/0629; A47J 37/0623; A47J 37/0664; F24C 15/322; F24C 15/32; F24C 15/325; F24C 15/327
See application file for complete search history.

(56) References Cited

U.S. PATENT DOCUMENTS

2007/0138160 A1* 6/2007 Ando .................... F24C 15/327
219/401

FOREIGN PATENT DOCUMENTS

WO 2012-032449 * 3/2012
WO 2012/032449 A1 3/2012

* cited by examiner

*Primary Examiner* — Shawntina T Fuqua
(74) *Attorney, Agent, or Firm* — Lerner, David, Littenberg, Krumholz & Mentlik, LLP

(57) ABSTRACT

Food cooking appliance comprising: a centrifugal turbine arranged to create an air flow inside a cooking space, a steam extraction window arranged so as to extract, toward the exterior of the appliance, steam present inside the cooking space, wherein the extraction window has, at every point on its passageway surface, a normal direction with at least one non-zero component along a tangential direction to a circle centered on the centrifugal turbine and passing to the center of the extraction window.

16 Claims, 2 Drawing Sheets

AIR FLOW COOKING APPLIANCE

CROSS-REFERENCE TO RELATED APPLICATION

This application claims priority to French Patent Application No. 1655557 filed Jun. 15, 2016, the disclosure of which is hereby incorporated in its entirety by reference.

FIELD OF THE INVENTION

This invention pertains generally to a household cooking appliance, and in particular to a portable or transportable air flow cooking appliance.

DESCRIPTION OF RELATED ART

In the prior art, there exist convection or air flow cooking appliances, such as the one described in patent document WO 2012032449 A1. However, this appliance presents the particular disadvantage of having a complex internal structure, yet without being able to effectively release steam generated while the food is being cooked.

One objective of this invention is to remedy the disadvantages of the prior art mentioned above, and in particular, firstly, to propose an air flow cooking appliance with a simple internal structure that can effectively release steam present in a cooking space of this appliance.

SUMMARY OF THE INVENTION

To this end, a first aspect of the invention pertains to a food cooking appliance comprising:
   A centrifugal turbine arranged so as to create an air flow inside a cooking space,
   A steam extraction window arranged so as to extract, toward the exterior of the appliance, steam present inside the cooking space,
   characterized in that the extraction window has, at every point on its passageway surface, a normal direction with at least one non-zero component along a direction tangential to a circle centered on the centrifugal turbine and passing to the center of the extraction window.

The cooking appliance according to the present embodiment comprises an extraction window forming one upstream end of a conduit toward the exterior of the appliance, to enable steam to be released from the cooking space. The orientation of the extraction window is chosen so that the air flow, which has a tangential component at the outlet of the centrifugal turbine, strikes the extraction window. In other words, the extraction window is not parallel to a tangent line of a circle that is centered on the centrifugal turbine and passes through the center of the extraction window, which makes it unnecessary to install, inside the cooking space, a deflector oriented toward the extraction window, for example.

The term "center of the extraction window" refers to the median or middle area or the area that is equidistant from the edges of the extraction window, in a projection plane that is perpendicular to the axis of rotation of the centrifugal turbine.

Advantageously, the extraction window is arranged facing an exhaust area of the centrifugal turbine.

Advantageously, the extraction window has, at every point on its passageway surface, a normal direction oriented at an angle ranging between 110° and 125°, and more preferably between 110° and 118°, with respect to the direction running tangent to the circle centered on the centrifugal turbine and passing to the center of the extraction window. The applicant has determined that this orientation allows for optimal extraction of steam.

Advantageously, the cooking appliance comprises a steam extraction conduit arranged between the extraction window and the exterior of the cooking appliance and having a longitudinal direction, and the extraction window has, at every point on its passageway surface, a normal direction oriented with respect to the longitudinal direction of the steam extraction conduit at an angle ranging between 20° and 35°, and more preferably between 20° and 28°.

In other words, the invention also pertains to a food cooking appliance comprising:
   A centrifugal turbine arranged to create an air flow inside a cooking space,
   A steam extraction window arranged to extract, toward the exterior of the appliance, steam present inside the cooking space,
   A steam extraction conduit arranged between the extraction window and the exterior of the cooking appliance and having a longitudinal direction, characterized in that the extraction window has, at every point on its passageway surface, a normal direction oriented with respect to the longitudinal direction of the steam extraction conduit, at an angle ranging between 20° and 35°, and more preferably between 20° and 28°.

Advantageously, the extraction window and/or the extraction conduit are directly formed by an enclosure defining the cooking space. This embodiment makes it possible to limit the number of additional parts and related assemblies.

Advantageously, the cooking space comprises an upper part of the cooking space formed by an upper enclosure comprising at least one flat surface parallel to an axis of rotation of the centrifugal turbine, on which the extraction window is arranged, and the extraction window is oriented with respect to the flat surface at an angle ranging between 20° and 35°, and more preferably between 20° and 28°.

In other words, the invention also pertains to a food cooking appliance comprising:
   A centrifugal turbine arranged to create an air flow inside a cooking space,
   A steam extraction window arranged to extract, toward the exterior of the appliance, steam present inside the cooking space,
   An upper part of the cooking space formed by an upper enclosure comprising at least one flat surface parallel to an axis of rotation of the centrifugal turbine, on which the extraction window is arranged,
   characterized in that the extraction window is oriented with respect to the flat surface, at an angle ranging between 20° and 35°, and more preferably between 20° and 28°.

Advantageously, the extraction window is formed by a flat screen. Such a window is simple to produce.

Advantageously, the centrifugal turbine comprises multiple paddles, and the extraction window has at least one portion arranged at a distance of less than 10 mm and preferably less than 5 mm from one end of the paddles. This embodiment makes it possible to increase the efficacy of extraction by establishing proximity between the extraction window and the centrifugal turbine.

Advantageously, the cooking appliance comprises a casing and a cooking basket that can be removed from the casing and that is arranged to hold the food being cooked, in which the cooking basket can be moved in translation with respect to the casing, along a direction perpendicular to the axis of rotation of the centrifugal turbine.

Advantageously, the cooking appliance comprises a heating means, arranged between the cooking basket and the centrifugal turbine.

Advantageously, the extraction window is arranged on one side of the cooking appliance, opposite one side where the cooking basket can be grasped by a user. The extraction window is therefore opposite the area where the user maneuvers, which improves safety, and this also prevents having condensation on the walls that are visible to the user.

Advantageously, the cooking basket is assembled as a sliding connection with respect to the casing.

Advantageously, the cooking appliance comprises a means of establishing airtightness, arranged between a door attached to the cooking basket and the casing of the appliance.

BRIEF DESCRIPTION OF THE DRAWINGS

Other characteristics and advantages of the present invention will become more clearly apparent through the detailed description below, of one embodiment of the invention, which is provided as a non-limiting example, illustrated in the attached drawings, in which.

DETAILED DESCRIPTION OF THE INVENTION

Figure 1:
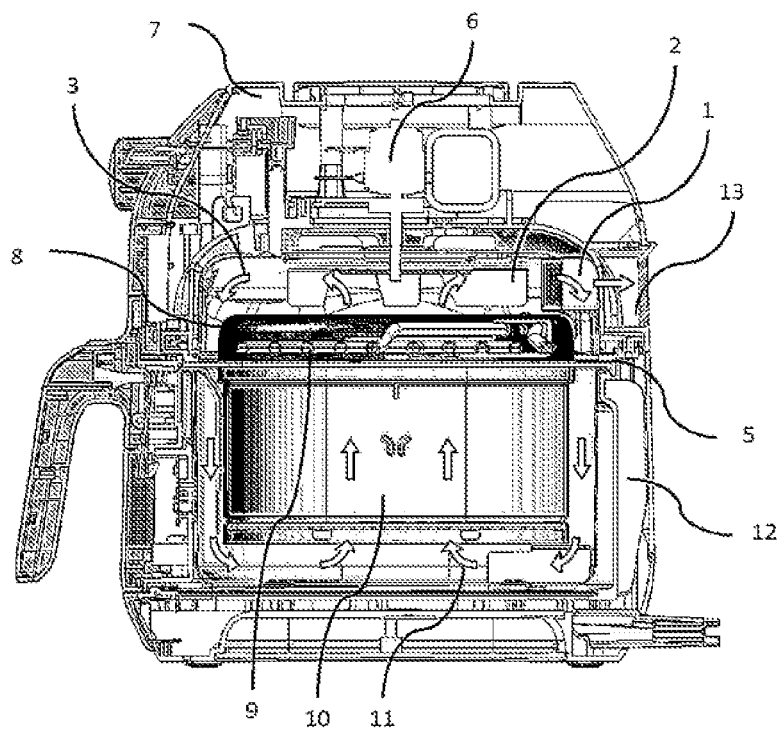
FIG. 1 is a cross-section view of a cooking appliance according to the invention with a cooking space comprising a centrifugal turbine and a steam extraction window.

FIG. 1 depicts a cross-section view of an air flow cooking appliance, which comprises a centrifugal turbine (2), arranged in a cooking space formed by an upper cavity (3) and a reservoir (11). The reservoir (11) as well as a cooking basket (10) are removable with respect to a casing (7). These components are guided in translational movement along a guide formed by a cooking chamber (12) and a ring (5). The ensemble is removed through the front of the appliance (to the left in FIG. 1), using a gripping handle, as shown in FIG. 1.

Food is cooked in the cooking basket (10). The air in the cooking space is heated by means of an element (9), and then set in motion inside this cooking space by the centrifugal turbine (2) connected to a motor (6) for this purpose. The air is drawn in by the cooking basket (10) via a deflector (8). It is heated as it passes by the element (9). The air is then propelled radially onto the walls of the upper cavity (3) by the centrifugal turbine (2). The heated air descends along the wall of the upper cavity (3) and of the reservoir (11) before heating the food inside the cooking basket (10). The arrows in FIG. 1 illustrate the path of the air flow.

However, it should be noted that due to the rotational movement of the centrifugal turbine (2), the air flow at the outlet of the centrifugal turbine (2) and descending along the wall of the cooking chamber (12) is also spinning, which means that it follows a helix-shaped or cyclonic movement.

Figure 2:
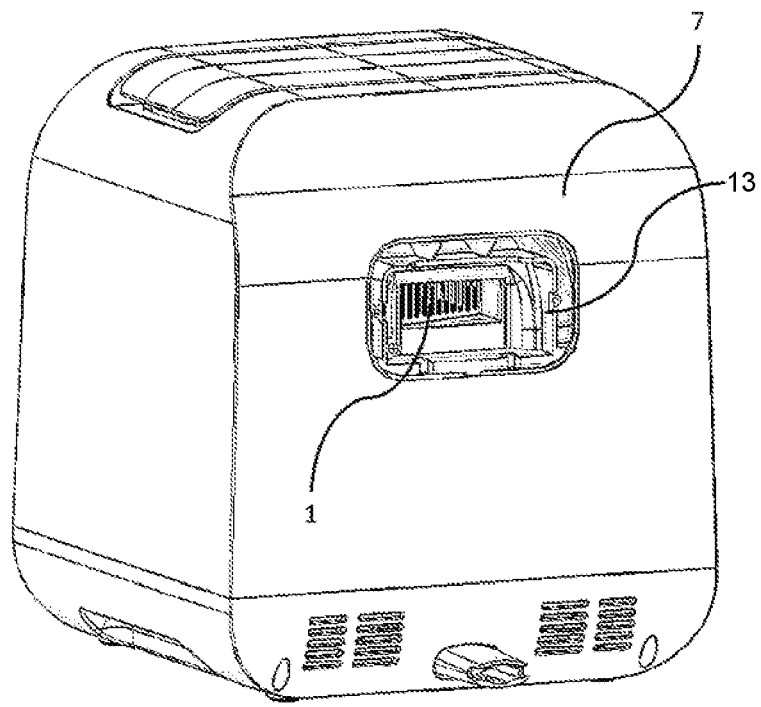
FIG. 2 is a perspective view of a rear surface of the appliance in FIG. 1.

In order to prevent excess pressure due to the creation of steam during cooking (water evaporating from the food being cooked), an extraction window (1) is provided in the upper cavity (3), facing an exhaust area of the centrifugal turbine (2). The steam formed while the food is cooking is released through the extraction window (1), and then through an extraction conduit (13) in the rear upper part of the cooking chamber, as shown in FIG. 2. Thus, the steam can be released through the rear, opposite the gripping handle and the front surface, which prevents any interference with the user and any condensation on the front surface.

Figure 3:
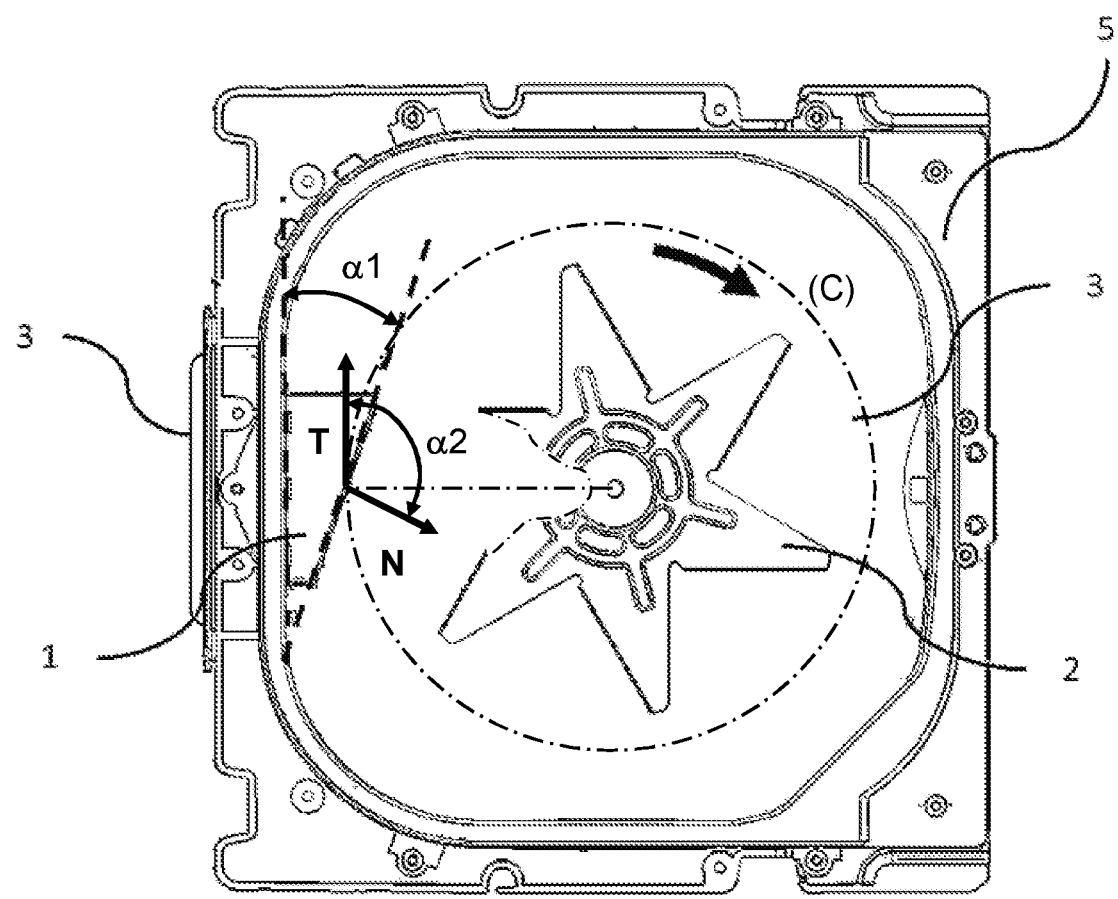
FIG. 3 is a view from below of an upper part of the cooking space of the appliance in FIG. 1.

In order to best guide the moist air toward the extraction conduit (13), the invention proposes a particular arrangement of the extraction window (1) inside the upper cavity (3), as shown in FIG. 3.

The extraction window (1) is assembled on the upper cavity (3) facing the exhaust of the centrifugal turbine (2) (of which a portion of the paddles has been masked for clarity purposes). The vent screen forming the extraction window (1) is oriented judiciously, so as to catch as much as possible of the flow exiting the centrifugal turbine (2), which has a radial component, as well as a tangential component (T).

The applicant has defined an angle ($\alpha 1$) of a minimum of 20° and a maximum of 35° between the extraction window (1) and the flat rear surface of the upper cavity (3). Ideally, an angle ($\alpha 1$) of 24°±4° will be preferred.

Alternatively, an angle ($\alpha 2$) between a normal direction (N) to the extraction window (1) and a tangential direction (T) of a circle (C) centered on the centrifugal turbine (2) and passing through the center of the extraction window (1) is between 110° and 125°, and it is ideally within a value range between 110° and 118°.

Finally, as shown in FIG. 3, the extraction window (1) is forward inside the upper cavity (3) in order to be as close as possible to the paddles of the centrifugal turbine (2), in order to catch as much steam as possible. A distance of less than 10 mm, and more preferably less than 5 mm, can be provided between the extraction window (1) and the paddles of the centrifugal turbine (2).

To summarize, the invention effectively extracts steam created during cooking due to the orientation of the extraction window, which is not parallel to the tangential direction of the concentric circle to the centrifugal turbine (2) and passing to the middle of the extraction window, and due to the proximity of the extraction window with the paddles of the centrifugal turbine (2), the extraction window (1) forming one upstream end of a conduit leading to the exterior of the appliance.

Of course, various modifications and/or improvements that would be obvious to a person skilled in the art may be made to the different embodiments of the invention explained in this description, while still remaining within the scope of the invention as defined by the attached claims.

The invention claimed is:

1. A food cooking appliance comprising:
   a centrifugal turbine arranged to create an air flow inside a cooking space;
   a steam extraction window arranged so as to extract, toward an exterior of the appliance, steam present inside a cooking space, the steam extraction window comprising a vent screen oriented to directly catch a flow exiting the centrifugal turbine,
   wherein the extraction window has, at every point on its passageway surface, a normal direction (N) with at least one non-zero component along a tangential direction (T) to a circle (C) centered on the centrifugal turbine and passing to a center of the extraction window.

2. The cooking appliance according to claim 1, in which the extraction window has, at every point on its passageway surface, a normal direction (N) oriented at an angle ($\alpha 2$) ranging between 110° and 125°, with respect to the tangential direction (T) to the circle (C) centered on the centrifugal turbine and passing to the center of the extraction window.

3. The cooking appliance according to claim 1, comprising a steam extraction conduit arranged between the extraction window and the exterior of the cooking appliance, and having a longitudinal direction, in which the extraction window has, at every point on its passageway surface, a normal direction (N) oriented with respect to the longitudinal direction of the steam extraction conduit at an angle ranging between 20° and 35°.

4. The cooking appliance according to claim 3, in which one or both of the extraction window and the extraction conduit are directly formed by an enclosure defining the cooking space.

5. The cooking appliance according to claim 1, in which the cooking space comprises an upper part of the cooking space formed by an upper enclosure comprising at least one flat surface parallel to an axis of rotation of the centrifugal turbine, on which is arranged the extraction window, and in which the extraction window is oriented with respect to a flat surface at an angle (a1) ranging between 20° and 35°.

6. The cooking appliance according to claim 1, in which the extraction window is formed by a flat screen.

7. The cooking appliance according to claim 1, in which the centrifugal turbine comprises multiple paddles, and in which the extraction window has at least one portion arranged at a distance of less than 10 mm from one end of the paddles.

8. The cooking appliance according to claim 1, comprising a casing and a cooking basket that is removable with respect to the casing and arranged to hold the food being cooked, in which the cooking basket can be moved in translation with respect to the casing, along a direction perpendicular to an axis of rotation of the centrifugal turbine.

9. The cooking appliance according to claim 8, comprising a heating means, arranged between the cooking basket and the centrifugal turbine.

10. The cooking appliance according to claim 8, in which the cooking basket is assembled as a sliding connection with respect to the casing.

11. The cooking appliance according to claim 8, in which the extraction window is arranged on one side of the cooking appliance opposite a side where the cooking basket can be grasped by a user.

12. The cooking appliance according to claim 8, comprising a means of establishing airtightness arranged between a door attached to the cooking basket and the casing of the appliance.

13. The cooking appliance according to claim 1, in which the extraction window has, at every point on its passageway surface, a normal direction (N) oriented at an angle (a2) ranging between 110° and 118°, with respect to the tangential direction (T) to the circle (C) centered on the centrifugal turbine and passing to the center of the extraction window.

14. The cooking appliance according to claim 1, comprising a steam extraction conduit arranged between the extraction window and the exterior of the cooking appliance, and having a longitudinal direction, in which the extraction window has, at every point on its passageway surface, a normal direction (N) oriented with respect to the longitudinal direction of the steam extraction conduit at an angle ranging between 20° and 28°.

15. The cooking appliance according to claim 1, in which the cooking space comprises an upper part of the cooking space formed by an upper enclosure comprising at least one flat surface parallel to an axis of rotation of the centrifugal turbine, on which is arranged the extraction window, and in which the extraction window is oriented with respect to a flat surface at an angle (a1) ranging between 20° and 28°.

16. The cooking appliance according to claim 1, in which the centrifugal turbine comprises multiple paddles, and in which the extraction window has at least one portion arranged at a distance of less than 5 mm from one end of the paddles.

\* \* \* \* \*